(No Model.)

E. R. PROCTER.
NUT LOCK.

No. 333,548. Patented Jan. 5, 1886.

Attest:
A. P. Knight
Geo. L. Wheelock

Inventor:
Edwin R. Procter
By Knight Bros
Attys

UNITED STATES PATENT OFFICE.

EDWIN R. PROCTER, OF WASHINGTON COURT-HOUSE, OHIO.

NUT-LOCK.

SPECIFICATION forming part of Letters Patent No. 333,548, dated January 5, 1886.

Application filed February 26, 1885. Serial No. 157,126. (No model.)

*To all whom it may concern:*

Be it known that I, EDWIN R. PROCTER, of Washington Court-House, Fayette county, Ohio, have invented a new and useful Improvement in Nut-Locks, of which the following is a specification.

My invention is an improvement in the class of devices for secure retention of screw-nuts upon their bolts, and for rendering impossible their loosening or detachment either by jarring action of the structure they are employed to fasten or by acts of mischievous persons.

My improvement is more particularly designed for, and is here illustrated in connection with, means to fasten the abutting ends of the consecutive rails of a railway.

Figure 1:
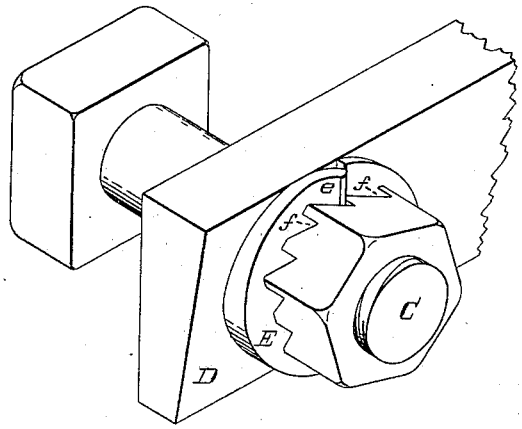
Figure 4:
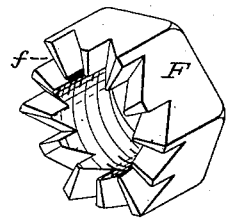
Figure 2:
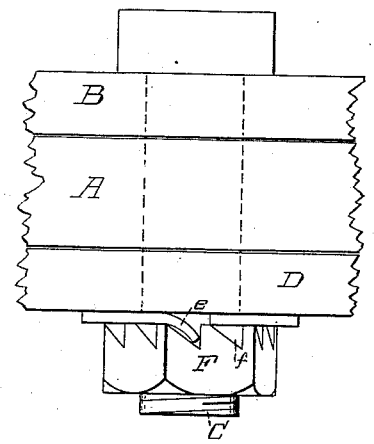
Figure 3:
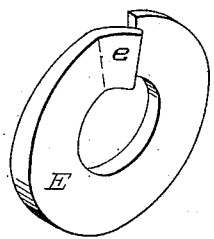

In the accompanying drawings, Figure 1 is a perspective view representing a customary fish-bolt in association with a portion of my front fish-plate, my washer-detent, and the serrated nut. Fig. 2 is a top view of these members, together with portions of a rail or other object to be fastened, and of the customary rear fish-plate. Fig. 3 is a perspective view of the washer-detent on its front side. Fig. 4 is a sole side perspective view of the serrated nut.

A may represent a portion of a railway-rail or other object to be fastened.

B may represent part of a customary fish-bar or fish-plate.

C may represent a screw-bolt, such as customarily employed to secure the fish-plates to a railway-rail.

My front fish-plate, D, portions of which are shown in Figs. 1 and 2, is trapezoidal in its transverse section, so as to present a downwardly chamfered or beveled face, d.

My washer E consists of a radially-split ring, preferably of steel beveled upward on its rear face, with corresponding and reverse obliquity to the said bevel of the fish-plate, so as to bring the front face of said washer parallel with the rear face of the fish-plate, and consequently at right angles to the screw-bolt. The washer's severed edge on the left side of the split is bent outward, so as to constitute a spring lip or pawl, e, capable of engagement, as shown in Figs. 1 and 2, in the ratchet-teeth f on the sole side of the nut F, and of thereby preventing retrograde rotation of such nut.

I am aware that some washers of railway-joints have been formed with teeth or spurs to occupy indentations in the nut to prevent retrograde rotation thereof, and that other washers of railway-joints have been formed wedge-shaped, the nut having in cross-section like size and shape, whereby both may be worked on or off the bolt together, and the washer requiring no appliances on the fish-plate to prevent retrograde rotation thereof. I therefore disclaim invention in such features, broadly or separately considered.

I claim as new and of my invention—

1. The nut-lock consisting of the combination, with a screw-bolt, and with a nut therefor having ratchet-notches $f$ in its sole side, of the downwardly chamfered or beveled fish-plate D, and of the upwardly chamfered or beveled radially-split washer E, having the outturned spring-lip $e$ on the left side of the split, as and for the purpose set forth.

2. In a nut-lock, the upwardly-chamfered radially-split washer E, having the outturned spring-lip $e$ on the left side of the split, as and for the purpose set forth.

In testimony of which invention I hereunto set my hand.

EDWIN R. PROCTER.

Attest:
A. P. KNIGHT,
CHAS. E. PRIOR.